3,084,158
11β,18-OXIDO-18ξ-METHYL-PROGESTERONE

Georges Muller, Nogent-sur-Marne, and Jacques Martel, Bondy, France, assignors, by mesne assignments, to Roussel-UCLAF, S.A., Paris, France, a corporation of France
No Drawing. Filed July 10, 1961, Ser. No. 122,664
Claims priority, application France July 8, 1960
12 Claims. (Cl. 260—239.55)

The invention relates to the novel compound, 11β,18-oxido-18ξ-methyl-progesterone and a novel process for the preparation of said novel compound. The invention also relates to novel intermediates thereof.

11β,18-oxido-18ξ-methyl-progesterone is a biologically active steroid possessing an anti-aldosteronic activity.

It is an object of the invention to provide the novel compound, 11β,18-oxido-18ξ-methyl-progesterone.

It is a further object of the invention to provide a process for the preparation of 11β,18-oxido-18ξ-methyl-progesterone.

It is an additional object of the invention to provide novel intermediates for the preparation of 11β,18-oxido-18ξ-methyl-progesterone.

These and other objects and advantages will become obvious from the following detailed description.

The process of the invention comprises reacting the 11,18-lactone of 3-ethylenedioxy-11β,20β-dihydroxy-Δ⁵-pregnene-18-oic acid with a methyl magnesium halide to form 3-ethylenedioxy-11β,18-18,20β-bis-oxido-18ξ-methyl-Δ⁵-pregnene, reacting the latter with acetic anhydride in the presence of an acetic complex of boron fluoride to form 3-ethylenedioxy-11β,18-oxido-18-methylene-20β-acetoxy-Δ⁵-pregnene, catalytically hydrogenating the latter to form 3-ethylenedioxy-11β,18-oxido-18ξ-methyl-20β-acetoxy-Δ⁵-pregnene, hydrolyzing the latter to form 11β,18-oxido-18ξ-methyl-20β-acetoxy-Δ⁴-pregnene-3-one, saponifying the latter to form 11β,18-oxido-18ξ-methyl-Δ⁴-pregnene-20β-ol-3-one, oxidizing the latter to form 11β,18-oxido-18ξ-methyl-progesterone and recovering said product.

A preferred mode of the process of the invention comprises reacting the 11,18-lactone of 3-ethylenedioxy-11β,20β-dihydroxy-Δ⁵-pregnene-18-oic acid with methyl magnesium bromide in an inert organic solvent such as tetrahydrofuran at reflux temperatures to form 3-ethylenedioxy-11β,18-18,20β-bis-oxido-18ξ-methyl-Δ⁵-pregnene, reacting the latter with acetic anhydride in the presence of an acetic complex of boron fluoride and acetic acid to form 3-ethylenedioxy-11β,18-oxido-18-methylene-20β-acetoxy-Δ⁵-pregnene, hydrogenating the latter in the presence of platinum oxide in an organic solvent such as acetic acid to form 3-ethylenedioxy-11β,18-oxido-18ξ-methyl-20β-acetoxy-Δ⁵-pregnene, hydrolyzing the latter in a lower alkanol under acidic conditions to form 11β,18-oxido-18ξ-methyl-20β-acetoxy-Δ⁴-pregnene-3-one, saponifying the latter to form 11β,18-oxido-18ξ-methyl-Δ⁴-pregnene-20β-ol-3-one, oxidizing the latter with chromic acid in acetic acid to form 11β,18-oxido-18ξ-methyl-progesterone and recovering the latter. The process is illustrated in Table I.

TABLE I

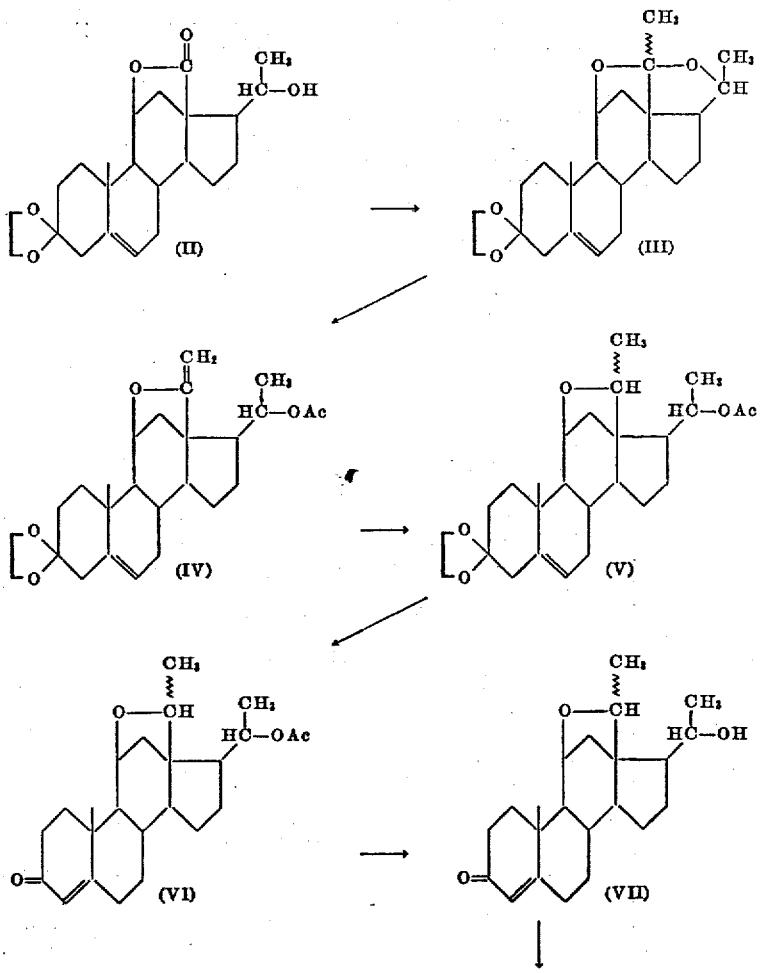

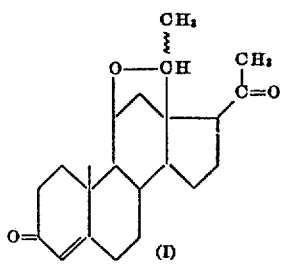

wherein Ac is the acetyl radical.

The starting material, 11,18-lactone of 3-ethylenedioxy-11β,20β-dihydroxy-Δ5-pregnene-18-oic acid, is obtained according to Wettstein et al., Experientia, 1960, p. 21.

In the following examples there are described several preferred embodiments to illustrate the invention. However, it should be understood that the invention is not intended to be limited to the specific embodiments.

EXAMPLE

*Preparation of 11β,18-Oxido-18ξ-Methyl-Progesterone, I*

STEP A.—3-ETHYLENEDIOXY-11β,18-18,20β-BIS-OXIDO-18ξ-METHYL-Δ5-PREGNENE, III 1.556 gm. of the 11,18-lactone of 3-ethylenedioxy-11β, 20β-dihydroxy-Δ5-pregene-18-oic acid, II (obtained according to Wettstein et al., Experientia, 1960, p. 21), were dissolved in 25 cc. of hot benzene. The reaction mixture was cooled to 40° C. and 33 cc. of a 0.8 N solution of methyl magnesium bromide in tetrahydrofuran were added. The reaction mixture was heated to reflux for a period of one hour, then poured onto a mixture of ice and ammonium chloride. The aqueous mixture was extracted with methylene chloride and the extracts were combined, washed with water, dried and evaporated to dryness under vacuum. The residue was crystallized from isopropyl ether and supplied 3-ethylenedioxy-11β,18-18,20β-bisoxido-18ξ-methyl-Δ5-pregnene, III, with a yield of 75%. The compound had a melting point of 185° C. and a specific rotation $[\alpha]_D^{20} = +10°$ (c.=0.5% in chloroform).

The I.R. spectra (determined in chloroform) confirms the absence of hydroxyl and carbonyl groups and shows a strong band at 899 cm.$^{-1}$ characteristic of the bisoxido system.

The product occurred in the form of white crystals, soluble in alcohol, ether, acetone, benzene and chloroform, insoluble in water and dilute aqueous alkalis.

*Analysis.*—$C_{24}H_{34}O_4$: Molecular weight=386.51. Calculated: C, 74.57%; H, 8.87%. Found: C, 74.6%; H, 8.9%.

This compound is not described in the literature.

STEP B.—3-ETHYLENEDIOXY-11β,18-OXIDO-18-METHYLENE-20β-ACETOXY-Δ5-PREGNENE, IV 1.7 gm. of 3-ethylenedioxy-11β-18, 18-20β-bisoxido-18ξ-methyl-Δ5-pregnene, III, were covered by 7 cc. of acetic acid anhydride. 0.5 cc. of a 10% solution of the acetic complex of boron fluoride in acetic acid was added, and the mixture was triturated for a period of ten minutes. 3 - ethylenedioxy - 11β,18 - oxido - 18 - methylene-20β-acetoxy-Δ5-pregnene, IV, crystallized.

It was vacuum filtered, washed with isopropyl ether, and 1.15 grams of product were recovered. The mother liquors and wash liquors were combined and supplied, after evaporation of the isopropyl ether, another 0.337 gm. of the product, melting at 232° C., were obtained. The product was used as such for the next step of the synthesis.

For analysis, the product was recrystallized from methylethylketone and a sample melting at 237–238° C. was obtained, having a specific rotation $[\alpha]_D^{20} = -14°$ (c.=0.5% in chloroform). The product occurred in the form of white prismatic crystals, soluble in ether, acetone, benzene and chloroform, very slightly soluble in alcohol and insoluble in water.

*Analysis.*—$C_{26}H_{36}O_5$: Molecular weight=428.55. Calculated: C, 72.86%; H, 8.47%. Found: C, 72.8%; H, 8.4%.

The I.R. spectra, determined in carbon disulfide, shows a small band at 3,125 cm.$^{-1}$ and a shoulder towards 3,015 cm.$^{-1}$ as well as a band at 1,665 cm.$^{-1}$.

This compound is not described in the literature.

STEP C.—3-ETHYLENEDIOXY-11β,18-OXIDO-18ξ-METHYL-20β-ACETOXY-Δ5-PREGNENE, V 500 mg. of 3-ethylenedioxy-11β,18-oxido-18-methylene-20β-acetoxy-Δ5-pregnene, IV, were dissolved in 15 cc. of acetic acid. 250 mg. of platinum oxide previously hydrogenated in acetic acid were added and the mixture formed was subjected to hydrogenation for a period of about twenty minutes, until the absorption of a molecular equivalent of hydrogen. The catalyst was eliminated by filtration and the filtrate was poured into water. The aqueous solution was extracted with methylene chloride, and the extracts were combined, washed with water, with a saturated solution of sodium bicarbonate, again with water, then dried and evaporated to dryness under vacuum. 3-ethylenedioxy-11β,18-oxido-18ξ-methyl-20β-acetoxy-Δ5-pregnene, V, precipitated. It was purified by chromatography over alumina and a product molting at 203° C. was obtained with a yield of 65%. The product occurred in the form of white platelets, soluble in ether, alcohol, acetone, benzene and chloroform, insoluble in water.

This product is not described in the literature.

STEP D.—11β,18-OXIDO-18ξ-METHYL-20β-ACETOXY-Δ4-PREGNENE-3-ONE, VI 500 mg. of 3-ethylenedioxy-11β,18-oxido-18ξ-methyl-20β-acetoxy-Δ5-pregnene, V, was introduced in 10 cc. of methanol and 0.5 cc. of an aqueous normal solution of hydrochloric acid was added. The mixture was heated to reflux for a period of six minutes. After cooling, water was added and the mixture was extracted with methylene chloride. The extracts were combined, washed with water, dried, then evaporated to dryness under vacuum. 11β,18 - oxido-18ξ - methyl - 20β-acetoxy-Δ4-pregnene-3-one, VI, was obtained which, when crystallized from ether, gave a yield of 65–70% and had a melting point of 154° C. The product occurred in the form of white crystals, soluble in alcohol, slightly soluble in ether and insoluble in water and dilute aqueous acids or alkalis.

Ultraviolet spectra (ethanol): $\lambda_{max.}$ to 240 mμ, $\epsilon = 15,900$.

This compound is not described in the literature.

STEP E.—11β,18-OXIDO-18ξ-METHYL-Δ4-PREGNENE-20β-OL-3-ONE, VII 400 mg. of 11β,18-oxido-18ξ-methyl-20β-acetoxy-Δ4-pregnene-3-one, VI, were introduced into 10 cc. of methanol. 0.2 cc. of sodium hydroxide solution was added and the reaction mixture heated to reflux for a period of 30 minutes. It was then cooled, added slowly to water, iced and the 11β,18-oxido-18ξ-methyl-Δ⁴-pregnene-20β-ol-3-one, VII, was vacuum filtered and washed with water. The yield was 70% and the product had a melting point of 180° C. The product occurred in the form of white crystals, soluble in alcohol, insoluble in water and dilute aqueous acids or alkalis.

The I.R. spectra confirms the given structure and shows in particular the presence of a free hydroxyl, $E_{1cm}^{1\%} = 1.96$, $\epsilon = 56$ This compound is not described in the literature.

STEP F.—11β,18-OXIDO-18ξ-METHYLPROGESTERONE, I 344 mg. of raw 11β,18-oxido-18ξ-methyl-Δ⁴-pregnene-20β-ol-3-one, VII, in 5 cc. of acetic acid were treated under agitation at 16° C. with 1 cc. of acetic acid containing 10% water and 80 mg. of chromic acid. After six hours the mixture was extracted with methylene chloride, and the extracts were combined, washed with sodium bicarbonate and water, dried over magnesium sulfate and distilled to dryness. The residue, crystallized from isopropyl ether, had a melting point of 136° C. and a specific rotation $[\alpha]_D^{20} = +223°$ (c.=0.4% in chloroform). It occurred in the form of white starlike crystals, soluble in acetone, benzene and chloroform, slightly soluble in ethyl ether and isopropyl ether, and insoluble in water or dilute aqueous acids or alkalis.

*Analysis.*—$C_{22}H_{30}O_3$: Molecular weight=342.46. Calculated: C, 77.15%; H, 8.83%. Found: C, 77.2%; H, 9.0%.

I.R. spectra (determined in chloroform): bands at 1,700 cm.⁻¹ and 1,355 cm.⁻¹.

U.V. spectra (ethanol): $\lambda_{max.}$ to 240 mμ, $\epsilon = 15,550$.

This product is not described in the literature.

Various modifications of the process of the invention may be made without departing from the spirit or scope thereof, and it is to be understood that the invention is to be limited only as defined in the appended claims.

We claim:

1. 11β,18-oxido-18ξ-methyl-progesterone having a melting point of 136° C., a specific rotation $[\alpha]_D^{20} = +223°$ (c.=0.4% in chloroform), infrared bands in chloroform at 1,700 cm.⁻¹ and 1,355 cm.⁻¹ and an ultraviolet spectra in ethanol: $\lambda_{max.}$ to 240 mμ and $\epsilon = 15,550$.

2. 3-ethylenedioxy-11β,18-18,20β-bis-oxido-18ξ-methyl-Δ⁵-pregnene having a melting point of 185° C. and a specific rotation $[\alpha]_D^{20} = +10°$ (c.=0.5% in chloroform).

3. 3 - ethylenedioxy - 11β,18-oxido-18ξ-methyl-20β-acetoxy-Δ⁵-pregnene having a melting point of 203° C.

4. 11β,18 - oxido-18ξ-methyl-20β-acetoxy-Δ⁴-pregnene-3-one having a melting point of 154° C. and an ultraviolet spectra in ethanol: $\lambda_{max.}$ to 240 mμ and $\epsilon = 15,900$.

5. 11β,18 - oxido-18ξ-methyl-Δ⁴-pregnene-20β-ol-3-one having a melting point of 180° C.

6. 3 - ethylenedioxy-11β,18-oxido-18ξ-methylene-20β-acetoxy-Δ⁵-pregnene.

7. A process for the preparation of 11β,18-oxido-18ξ-methyl-progesterone which comprises reacting the 11,18-lactone of 3 - ethylenedioxy-11β,20β-dihydroxy-Δ⁵-pregnene-18-oic acid with a methyl magnesium halide to form 3 - ethylenedioxy - 11β,18-18,20β-bis-oxido-18ξ-methyl-Δ⁵-pregnene, reacting the latter with acetic anhydride in the presence of a boron fluoride to form 3-ethylenedioxy-11β,18-oxido-18-methylene-20β-acetoxy-Δ⁵-pregnene, catalytically hydrogenating the latter to form 3-ethylenedioxy - 11β,18 - oxido-18ξ-methyl-20β-acetoxy-Δ⁵-pregnene, hydrolyzing the latter to form 11β,18-oxido-18ξ-methyl-20β-acetoxy-Δ⁴-pregnene-3-one, saponifying the latter to form 11β,18 - oxido-18ξ-methyl-Δ⁴-pregnene-20β-ol-3-one, oxidizing the latter to form 11β,18-oxido-18ξ-methyl-progesterone and recovering the latter.

8. The process of claim 7 wherein the methyl magnesium halide is methyl magnesium bromide.

9. The process of claim 7 wherein the boron fluoride is a complex of boron fluoride and acetic acid.

10. The process of claim 7 wherein the hydrogenation is effected in the presence of a platinum catalyst.

11. The process of claim 7 wherein the oxidation is effected in the presence of chromic acid.

12. A process for the preparation of 11β,18-oxido-18ξ-methyl-progesterone which comprises reacting the 11,18-lactone of 3 - ethylenedioxy-11β,20β-dihydroxy-Δ⁵-pregnene-18-oic acid with methyl magnesium bromide to form 3 - ethylenedioxy - 11β,18-18,20β-bis-oxido-18ξ-methyl-Δ⁵-pregnene, reacting the latter with acetic anhydride in the presence of a complex of boron fluoride and acetic acid to form 3-ethylenedioxy-11β,18-oxido-18-methylene-20β-acetoxy-Δ⁵-pregnene, hydrogenating the latter in the presence of a platinum catalyst to form 3-ethylenedioxy-11β,18-oxido-18ξ-methyl-20β-acetoxy-Δ⁵-pregnene, hydrolyzing the latter under acidic conditions to form 11β,18-oxido-18ξ-methyl-20β-acetoxy-Δ⁴-pregnene-3-one, saponifying the latter to form 11β,18-oxido-18ξ-methyl-Δ⁴-pregnene-20β-ol-3-one, oxidizing the latter with chromic acid to form 11β,18-oxido-18ξ-methyl-progesterone and recovering the latter.

No references cited.

UNITED STATES PATENT OFFICE
CERTIFICATE OF CORRECTION

Patent No. 3,084,158                                April 2, 1963

Georges Muller et al.

It is hereby certified that error appears in the above numbered patent requiring correction and that the said Letters Patent should read as corrected below.

Column 6, line 6, for "-18$\xi$ -methylene-" read -- -18-methylene- --.

Signed and sealed this 5th day of November 1963.

(SEAL)
Attest:

ERNEST W. SWIDER
Attesting Officer

EDWIN L. REYNOLDS
Acting Commissioner of Patents